US010061706B2

(12) United States Patent
Bohra et al.

(10) Patent No.: US 10,061,706 B2
(45) Date of Patent: Aug. 28, 2018

(54) SYSTEM AND METHOD FOR EVICTION AND REPLACEMENT IN LARGE CONTENT-ADDRESSABLE FLASH CACHES

(71) Applicant: Datrium, Inc., Sunnyvale, CA (US)

(72) Inventors: Ata Bohra, Sunnyvale, CA (US); Mike Chen, Cupertino, CA (US); Boris Weissman, Palo Alto, CA (US)

(73) Assignee: Datrium, Inc., Sunnyvale, CA (US)

( * ) Notice: Subject to any disclaimer, the term of this patent is extended or adjusted under 35 U.S.C. 154(b) by 70 days.

(21) Appl. No.: 15/220,409

(22) Filed: Jul. 27, 2016

(65) Prior Publication Data

US 2017/0031831 A1 Feb. 2, 2017

Related U.S. Application Data

(60) Provisional application No. 62/197,528, filed on Jul. 27, 2015.

(51) Int. Cl.
*G06F 12/0891* (2016.01)

(52) U.S. Cl.
CPC .... *G06F 12/0891* (2013.01); *G06F 2212/222* (2013.01); *G06F 2212/60* (2013.01)

(58) Field of Classification Search
None
See application file for complete search history.

(56) References Cited

U.S. PATENT DOCUMENTS

| | | | | |
|---|---|---|---|---|
| 5,233,702 | A * | 8/1993 | Emma | G06F 12/0862 711/118 |
| 8,244,984 | B1 * | 8/2012 | Glasco | G06F 12/0804 711/133 |
| 9,489,306 | B1 * | 11/2016 | Murugesan | G06F 12/0815 |
| 2002/0166031 | A1 * | 11/2002 | Chen | G06F 12/0813 711/141 |
| 2003/0160796 | A1 * | 8/2003 | Lavelle | G06T 1/60 345/557 |
| 2006/0069843 | A1 * | 3/2006 | Emma | G06F 12/0848 711/3 |
| 2009/0204765 | A1 * | 8/2009 | Gupta | G06F 12/121 711/133 |
| 2012/0324172 | A1 * | 12/2012 | Rabinovitch | G06F 12/121 711/136 |
| 2013/0151780 | A1 * | 6/2013 | Daly | G06F 12/0897 711/122 |
| 2013/0346672 | A1 * | 12/2013 | Sengupta | G06F 12/0871 711/103 |
| 2014/0133233 | A1 * | 5/2014 | Li | G11C 16/0483 365/185.11 |

* cited by examiner

*Primary Examiner* — Midys Rojas
*Assistant Examiner* — Khoa D Doan
(74) *Attorney, Agent, or Firm* — Hickman Palermo Becker Bingham LLP

(57) ABSTRACT

In a processing system in which at least one entity issues data read and write requests to at least one storage system that stores data as data units, pluralities of data units are grouped. Each group is written as a respective cache line in a cache, which is deduplicated. Before evicting a selected one of the cache lines, a caching component determines whether at least one of the data units in the selected cache line is still active; if so, then the still active data unit(s) in the selected cache line is read and written to a different cache line.

18 Claims, 2 Drawing Sheets

SYSTEM AND METHOD FOR EVICTION AND REPLACEMENT IN LARGE CONTENT-ADDRESSABLE FLASH CACHES

CROSS-REFERENCE TO RELATED APPLICATIONS

This application claims priority of U.S. Patent Application 62/197,528, filed 27 Jul. 2015.

BACKGROUND

Caching is a common technique in computer systems to improve performance by enabling retrieval of frequently accessed data from a higher-speed cache instead of having to retrieve it from slower memory and storage devices. Caching occurs not only at the level of the CPU itself, but also in larger systems, up to and including caching in enterprise-sized storage systems or even potentially globally distributed "cloud storage" systems. Access to cached information is faster—usually much faster—than access to the same information stored in the main memory of the computer, to say nothing of access to information stored in non-solid-state storage devices such as a hard disk.

On a larger scale, dedicated cache management systems may be used to allocate cache space among many different client systems communicating over a network with one or more servers, all sharing access to a peripheral bank of solid-state mass-storage devices. This arrangement may also be found in remote "cloud" computing environments.

Data is typically transferred between memory (or another storage device or system) and cache as cache "lines", "blocks", "pages", etc., whose size may vary from architecture to architecture. Just for the sake of succinctness, all the different types of information that is cached in a given system are referred to commonly here as "data", even if the "data" comprises instructions, addresses, etc. Transferring blocks of data at a time may mean that some of the cached data will not need to be accessed often enough to provide a benefit from caching, but this is typically more than made up for by the relative efficiency of transferring blocks as opposed to data at many individual memory locations; moreover, because data in adjacent or close-by addresses is very often needed ("spatial locality"), the inefficiency is not as great as randomly distributed addressing would cause. A common structure for each entry in the cache is to have at least three elements: a "tag" that indicates where (generally an address) the data came from in memory; the data itself; and one or more flag bits, which may indicate, for example, if the cache entry is currently valid, or has been modified.

Regardless of the number, type or structure of the cache(s), the standard operation is essentially the same: When a system hardware or software component needs to read from a location in storage (main or other memory, a peripheral storage bank, etc.), it first checks to see if a copy of that data is in any cache line(s) that includes an entry that is tagged with the corresponding location identifier, such as a memory address. If it is (a cache hit), then there is no need to expend relatively large numbers of processing cycles to fetch the information from storage; rather, the processor may read the identical data faster—typically much faster—from the cache. If the requested read location's data is not currently cached (a cache miss), or the corresponding cached entry is marked as invalid, however, then the data must be fetched from storage, whereupon it may also be cached as a new entry for subsequent retrieval from the cache.

There are two traditional methods for tagging blocks in a cache. One is to name them logically, such as using a Logical Block Address (LBA). One drawback of this method is that when a remote host asks for the block at, say, LBA 18, it is difficult to determine if the block for LBA 18 that the remote host has is current or has been overwritten with new content. This problem of ensuring consistency is especially hard in the face of failures such as a host going out of communication for a while.

The second approach is to name blocks by their storage location. Traditional systems which update data in place have the same consistency issue as with LBA-tagged arrangements. Log-structured file systems are better in this second case because new content would have been written to a new location, such that if a block stored at address X is needed and the remote host has that block, the correct data will be referenced. But if the block has been moved, however, its storage location will change and although the remote cache may have the correct data, the address will be wrong. The host will therefore reply that it does not have the data, when it actually does.

Several issues commonly arise when considering the design of a caching system. One issue is locality: Data in a local cache can be accessed more quickly than data stored in a remote system. Each host therefore typically has a local cache so that it has to do a remote fetch as infrequently as possible.

Another issue is related to granularity. If data is cached as small units, such as individual blocks, the hit rate may be higher, but this will come at the cost of so much administrative overhead that the efficiency of caching is all but lost.

Yet another issue is that caching arrangements that use a storage medium such as flash are efficient when it comes to small read operations, but function best with large writes. A large write, however, such as of a cache line, may cause an overwriting of several smaller data units in the line that were still being actively used. Some data units may thus end up being evicted from the cache even though it would be more efficient to let them remain.

What is needed is thus a caching arrangement and method of operation that uses caching technology efficiently, without increasing overhead beyond the point of diminishing return, and without too much unnecessary evictions.

DETAILED DESCRIPTION

In broad terms, in a system in which multiple hosts access a common storage pool and each include a cache, embodiments of this invention enable each host to use a local, high-speed, flash cache to cache data at an efficiently large granularity, while still retaining the ability to manage smaller cached data units, in particular, with respect to eviction and replacement. The novel procedures and structures for this eviction and replacement system are described in detail below. Before that, however, a system context in which the invention may be implemented is first illustrated and described.

Co-pending U.S. patent applications Ser. No. 14/464,733 ("Hardware Resource Configuration Information Interface"); Ser. No. 14/520,610 ("Data Reconstruction in Distributed Data Storage System with Key-Based Addressing"); Ser. No. 14/568,700 ("Alternate Storage Arrangement in a Distributed Data Storage System with Key-Based Addressing"); and Ser. No. 15/177,342 ("System and Methods for Storage Data Deduplication") describe various characteristics of a storage system that avoids many of the problems of the prior art by employing content addressing. In this approach, sets of data blocks are grouped into "clumps". A fingerprint is then generated for the content of each clump, for example, using a SHA-1 cryptographic fingerprint of the data. Fingerprinting may also be done at the block level. The cache used in those systems is thus made content-addressable, such that if a cache is queried by fingerprint, the system can simply respond with the correct data (which will have the same fingerprint) without worrying about whether the corresponding logical block has been overwritten, or whether the block has been moved, or whether the block is in the cache for a particular disk or because some other disk with the duplicate block first fetched the block. These applications, which are co-owned with this one, and also share at least one inventor, are incorporated herein by reference, although the embodiments of the present invention described below may operate in systems other than the ones described in those co-pending patent applications.

Figure 1:
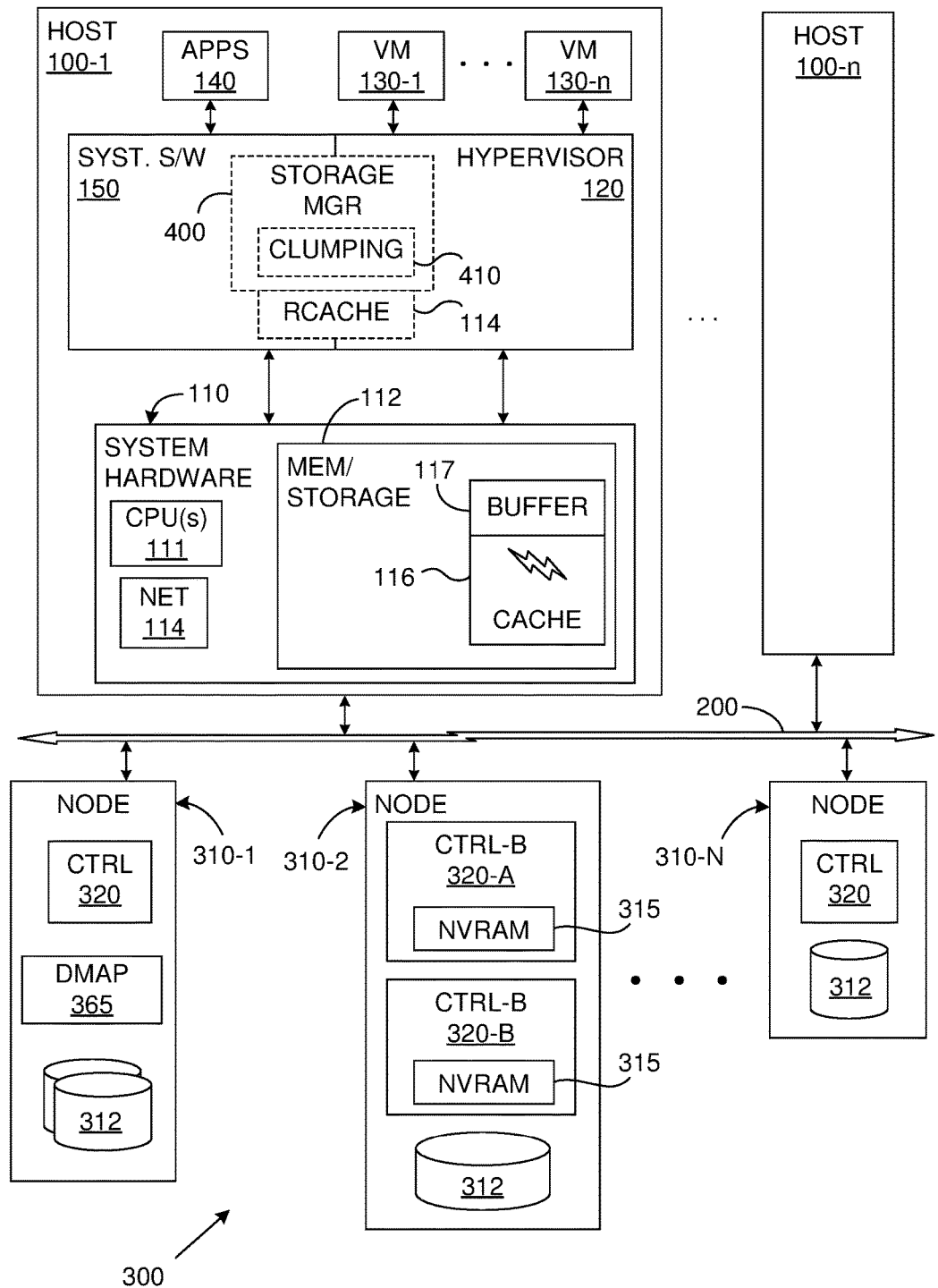
FIG. 1 illustrates the main hardware and software components of a distributed storage system.

FIG. 1 illustrates the main components of a basic embodiment of the invention, in which one or more hosts write data to one or more storage devices, which may be local to the hosts, or remote, or both. Each of one or more host platforms 100-1, . . . , 100-$n$ (referenced collectively as 100), which may, and typically will be, servers, includes system hardware 110, including one or more processors (CPU's) 111, and some device(s) 112 for non-persistent, volatile and/or persistent, non-volatile, non-transitory storage. The line between what is a "storage device" and "memory" is no longer as bright as it once was, however (consider Solid-State Devices—SSD—and NVRAM technologies, for example), and the embodiments described here do not presuppose such a distinction.

The hardware 110 will also include other conventional mechanisms such as a network connection device 114 for transfer of data between the various components of the system and one or more network(s) 200, which may be any known public or proprietary local or wide-area network such as the Internet, an internal enterprise network, etc. Note that, depending on the implementation and nature of the system, the host(s) may even communicate with external entities, such as storage nodes 300, over different networks, thereby allowing some parallel operations. The only requirement is that, whatever network(s) is/are used, the host 100 should be able to transmit and receive data to and from the nodes 300 it needs to access. "The" network 200 is therefore to be read as the collection of whichever networks are implemented, along with any necessary switching or other communications devices if data needs to pass between different networks.

For the sake of simplicity, only host 100-1 is illustrated in detail in FIG. 1, but other hosts will typically have the same main components and structure. In particular, each host 100 includes a caching arrangement which includes a flash cache 116. The caching arrangement is illustrated as being part of the memory/storage sub-system 112; this is one option, but is not required in embodiments of the invention. In addition to the "standard" flash memory, more modern technologies such as phase change memory, Intel's new 3D XPoint memory, etc., may also be used to implementation the cache 116. Reference to the cache 116 as being "flash" is therefore by way of example and is not intended to apply a limitation to any particular existing cache technology, although preferred embodiments operate with cache designed using some form of Solid State Drive (SSD) technology. Note that embodiments of the invention may be used in systems that have other components in their caching arrangement, such as a slower commodity cache, the usual CPU caches, etc.

Each host will also include conventional system software 150 such as, depending on the implementation, an operating system (OS) which includes a storage management software module 400, device drivers, etc. User-level applications 140 may then run in the known manner on the system software. If a host supports a virtualization platform, it will typically include some form of hypervisor 120, which forms the interface layer between the system hardware 110 and (in the illustrated embodiment) at least one virtual machine (VM) 130-1, . . . , 130-$n$ (referenced collectively as 130).

As is well known, a VM is a software abstraction of an actual physical computer system, including virtual memory and virtual disk storage, typically with one or more levels of intermediate address mapping from the VM's address space to the address space managed by the actual host operating system. The VMs are shown in FIG. 1 as being within the host merely for simplicity—in most implementations, a virtual machine is a "guest" that is running on the hypervisor/hardware host. In some virtualized systems, a "virtual machine monitor" is included as an interface to underlying software layers, such as the hypervisor or a host OS. Many hypervisors, such as the ESX Server family of products of VMware, Inc., run directly on "bare metal", that is, directly on the system hardware 110, and themselves include some of the software components that in other systems are part of the system software 150. In other virtualization platforms, the hypervisor may run on or at the same level as the host OS, which supports and performs some operations upon calls from the hypervisor. The various embodiments of the invention described here do not depend on any particular virtualization architecture, whether for the VMs, the hypervisor(s) or other virtualization layers. Indeed, the invention does not presuppose VMs at all, although the inventors anticipate that VMs will be a common workload that may benefit from the caching arrangement described here.

In embodiments of this invention, when an application or VM wants to save data persistently, it may write the data via, respectively, the system software 150 or hypervisor 120 to the storage management module 400, which processes the data for storage (see below for details) and forwards the processed data to other modules that actually write the data to a chosen persistent storage device, which may be local to the host or in a remote storage node. The storage management software module may also update metadata that enables it to retrieve the correct data at a later time in response to a read request from an application or VM.

Figure 2:
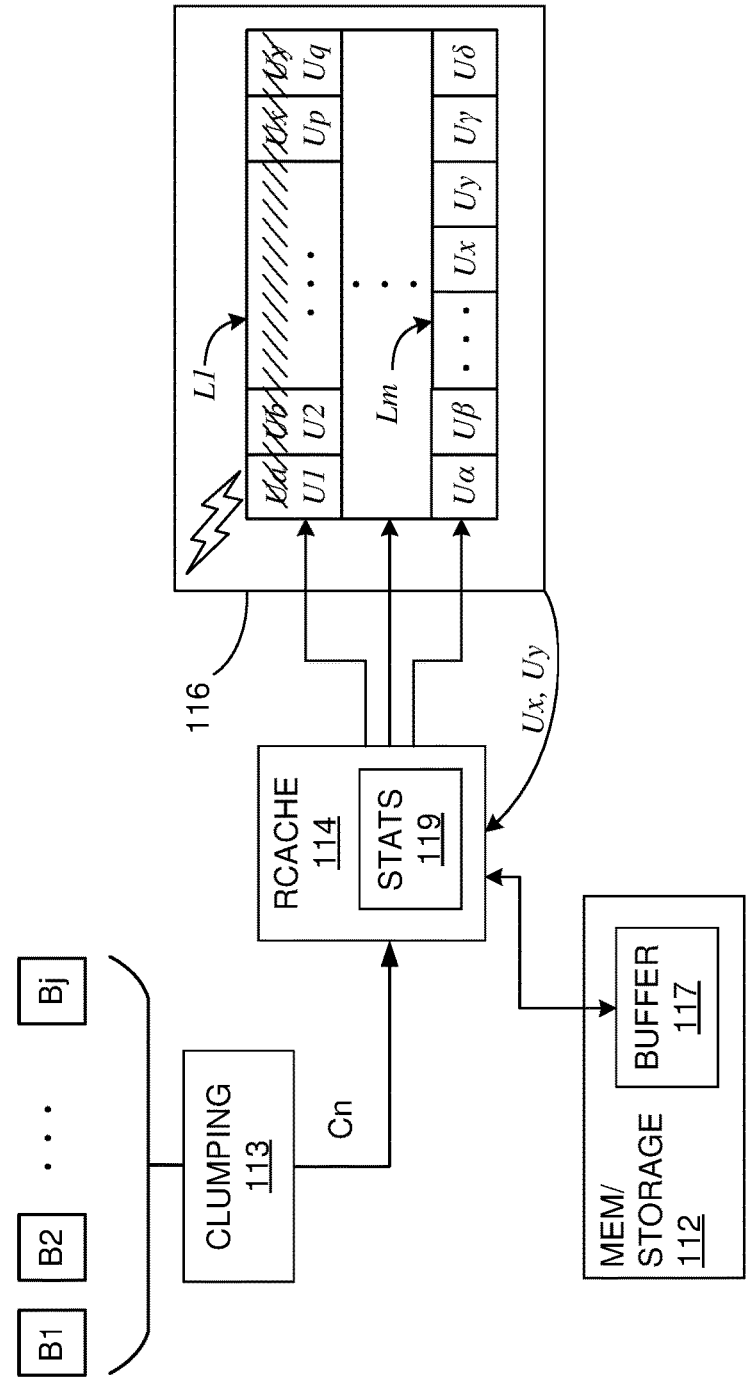
FIG. 2 shows various features (including some optional) of a cache arrangement.

A module 410 may also be included either within the storage manager 400, or elsewhere. As FIG. 2 illustrates, the clumping module 113 consolidates data blocks, such as blocks B1, B2, . . . Bj, into clumps, such as clump Cn. This is, however, just one example of the structure of data units that are written as units to the cache 116; other design choices may also be made for other embodiments of the invention.

The nodes 310-1, 310-2, . . . , 310-N represent respective storage entities. Although not illustrated (merely for the sake of simplicity), each node will typically include one or more processors, as well as non-transitory, volatile or non-volatile storage for the executable code that the processor(s) execute to perform the steps used to implement embodiments of this invention. Each node will typically include one or more persistent storage devices 312 such as, for example, a disk drive, flash SSD, etc., as well as some form of storage controller 320, 320-A, 320-B, which includes controller software. Depending on other design considerations, nodes may include either a single controller (such as the illustrated 310-1 and 310-N), or multiple controllers (such as shown for 310-2). Controllers may include their own local high-speed storage such as NVRAM 315 available, for example, for local caching or caching for hosts or other nodes. In multi-controller nodes (310-2), each controller preferably includes a conventional high-speed communication link between the controllers. Even other implementations will typically have some form of controller, or at least controller software, which may be an operating system, or control software for some specialized hardware device within the node. From the perspective of the hosts, the collection of nodes may form a single yet distributed storage system, that is, a storage pool 300.

Although the techniques described below may be applied in other contexts as well, for the purpose of illustration they are described with relation to use in the distributed storage system created by Datrium, Inc., which is the arrangement illustrated generally in FIG. 1 and other features of which are disclosed in the co-pending patent applications mentioned above. Below, for generality, the distributed virtual array (or whatever storage system the invention is implemented in) is abbreviated "DVX".

Furthermore, features of embodiments of the invention may in some cases be particularly advantageous for use in caching VM virtual disks, that is vDisks. This is just one possibility, however—the invention may also be used to advantage with files for processes, block storage logical units (such as Logical Unit Numbers—LUNs), etc., and with any form of writing entity, virtualized or not. Regardless of which entities write data that is cached, a component such as the storage manager 400 may apply data reduction techniques such as inline compression and deduplication to aid in capturing as much of their cumulative working data set in local caches as possible.

In embodiments of this invention the flash cache 116 in the hosts/servers stores content-addressable data and metadata objects, so that they can be accessed quickly and efficiently. Since flash capacity is usually limited, however, not all clumps can typically be stored on flash. Some clumps must therefore be replaced when new clumps are inserted, as the flash becomes full.

SSDs have a well-known property that results in I/O asymmetry: reads can be relatively small size and still be efficient and not affect SSD longevity, whereas writes should preferably be large and aligned to erasure blocks to improve flash endurance and minimize write amplification. For this reason, embodiments preferably include a server-side software module 114, referred to here for succinctness as "RCache". As FIG. 2 illustrates, RCache packs multiple separately addressable, and thus, readable, data units (such as blocks, clumps, etc.) into respective fixed sized large cache lines prior to asynchronously writing cache lines L1, ..., Lm to flash. The data units input to the RCache module may also be compressed. In FIG. 2, cache line L1 is shown as being comprised of separately readable data units Ua, Ub, ..., Ux, Uy, and line L2 is shown as being comprised of data units Uα, Uβ, ..., Uγ, Uδ. A cache line is typically at least an order of magnitude larger than one of the units Ui and preferentially aligned with erase blocks. In one implementation of an embodiment of the invention, for example, the data units (in that case, clumps) were on the order of 32 KB, cache lines were on the order of 1 MB, and there were several cache lines per cache erase block. As a result, when the flash cache 116 is full and a new cache line needs to be inserted, the units in some other selected cache line have to be evicted, meaning that references to them are removed.

In conventional systems, if a cache line is evicted, all of the data units it contained will need to be fetched from elsewhere, either from RAM or from the appropriate one(s) of the nodes 300. FIG. 2 illustrates an example in which a cache line L1, which previously contained data units Ua, Ub, ..., Ux, Uy has been overwritten so as to contain U1, U2, ..., Up, Uq instead. Because the evicted units will need to be fetched again if they are needed again, it is clearly advantageous to evict the units that are unlikely to be needed again soon and preferentially retain units that are likely to be needed soon. It is common in conventional systems to use "heat", or frequency of recent access, as an indication of the likelihood of another access in the near future relatively "hot" units are those that have been accessed recently whereas relatively "cold" units may not have been accessed recently. Other more sophisticated indicators, such as observed access patterns, may also be factors in determining which units are most advantageous to retain in a cache and which are less advantageous.

Not all readable units in a line may be equally "hot" or "cold". In other words, some of the units in a given cache line may contain data that is being actively used, whereas other units in the same line may be accessed seldom or not at all. Continuing with the example illustrated in FIG. 2, assume that units Ux and Uy were still being actively addressed when L1 (and thus Ux and Uy) was overwritten.

In order to "recover" or "rescue" useful, active "hot" units such as Ux and Uy in the evicted cache line L1, RCache may temporarily store them (in memory, for example) and reinsert them into a different cache line that is subsequently written to flash. In FIG. 2, Ux and Uy are thus illustrated as having been read back to Rcache, and then reinserted into a newly written cache line Lm. Such reinsertion of active data units will thereby help to avoid future access misses and associated roundtrips to the nodes 300 and spinning media.

One issue that arises is which cache line should be selected for eviction. Because it is relatively resource-consuming to read in data units and to copy them to a different cache line, the system preferably implements a policy that selects for eviction a cache line that has as relatively few active, "warm" data units as possible and an even fewer number of data units that are "hot", that is active enough that they should be recovered and reinserted elsewhere in the cache.

Now consider that a "dead" data unit in the cache is one that is no longer in use. For example, imagine a conventional (non-content-addressed) cache of the blocks in various files. If a file is deleted, all the blocks (an example of cached data units) for that file are now dead. Note that there is no reason to rescue a dead unit because none of the file's blocks will be accessed again. If the system (such as the Rcache module) could find a cache line full of dead units, then it could overwrite that line and not have to rescue any units from it before doing so. Conversely, any dead unit in any line in the cache is just wasting space since it will never be accessed. When that file gets deleted, the system may maintain a data structure and mark every unit that belonged to the deleted file as dead. The system may then look preferentially for cache lines with relatively many dead units (blocks, clumps, etc.) when trying to find a line to overwrite.

Content addressing, as in the Datrium system disclosed in the patent documents mentioned above, complicates the picture. One use of the Datrium content-addressing arrangement is for deduplication, which allows storage of only one copy of a data unit even when multiple files or VMs have the same content. Such duplication of content is very common in virtualized environments where the system disks of many VMs are often very similar to each other. With deduplication, multiple files/objects/VMs/etc., may refer to the same content-addressed data unit. Now consider what happens when a file is deleted in such a system: The content-addressed units referred to by that deleted file are now dead with respect to that deleted file, but there may yet be other files which still refer to the unit, such that the unit may not be dead with respect to all cached files. Thus, when a file is deleted, the units referred to it may or may not be dead. Similarly, when there is an overwrite of some blocks in a file/vdisk/object/etc., in a content-addressed system, the unit that holds the original content for the blocks that are overwritten are dead with respect to those logical positions in the file/vdisk/object. That is, those blocks now have new content so the old content is dead, at least for those blocks, and the new content is in new content-addressed data units, which now need to be added somewhere to the cache. As before, the old content may or may not be dead. There could be some other file or even other logical blocks at other locations of the same file that keep alive the old units with the old content.

One efficient eviction policy would be to evict from a cache, data that will be accessed furthest in the future. The problem with this, of course, is that it will generally not be possible to accurately predict future access needs. Typically, cache managers therefore apply a heuristic that data accessed frequently in the recent past is most likely to be accessed again in the near future. This is the idea behind an LRU queue, but other approximations of how "hot" a piece of data is, like the clock algorithm, are also in use, as are many other variants. However, if it is known that a data unit is completely dead (for example, the file it comes from has been deleted), the system can assume there will be not be any future accesses to that unit. One way to identify dead cached data units is to designate as dead or "cold" data units some portion of the bottommost entries in an LRU list), and choose for overwriting the cache line with the fewest non-dead, non-cold units; the active data units in the overwritten cache line can then be rescued and rewritten in a new, different cache line.

To address these issues, RCache module 114 may mark data units in the flash cache 116 as "hot" if they are recently or frequently accessed whereas "cold" data units are those that are not accessed for a long time. To this end, the RCache module 114 may include a statistics module 119 to track cache accesses. Alternatively, existing mechanisms may be used to track cache use. For example, the RCache module 114 may implement a variant of known access-based replacement algorithms, such as LRU, LFU, 2Q, Clock WS-Clock, etc.

In systems in which data unit in the cache are content-addressed (references to data units comprising a content-derived fingerprint), overwrites of individual data units may not be immediately recognized by the cache 116 using conventional mechanisms. One or more additional mechanisms may therefore be used to find dead data units in the cache. Once an overwritten data unit has been found, it is marked as "dead", making it a preferred choice for eviction. In practice, when the working set fits in the flash cache, "dead" data unit detection is more effective and accurate than selections using traditional access pattern-based replacement routines that ignore liveness information. A data unit could be accessed frequently, and so seem to be "hot", right up to the moment when overwrites or deletes make the unit "dead." As a policy, RCache preferentially uses "dead" data unit detection to find data units for eviction, falling back on access-based policies only when the cumulative working set of live data units does not fit in flash cache 116.

There must be some policy, therefore, to determine which cached data units are "dead" or at least so infrequently accessed that the cache line that contains them is a suitable candidate for eviction. Several approaches are possible. One option is for the Rcache (or any other) module to maintain reference counts on all data units. A unit referenced for several different vdisks and/or locations, for example, may be given a reference count equal to the number of such references. When a file is deleted, the reference counts may be decremented. Similarly, when some logical blocks are overwritten with new content, the reference counts for the units with the old content may be decremented. When the reference count reaches zero, the unit may be considered to be dead.

Another option is a process in which Rcache periodically examines all references and any data unit that does not have any references is deemed dead in the cache. The system may, as an option, then combine this information with a list of cold units and pick cache lines for overwrite and re-use accordingly.

Once a cache line is selected for eviction, its active, "hot", non-dead data units may then be re-inserted via the RCache module (the data unit rescue operation illustrated in FIG. 2), while "hot" but dead units and relatively cold units are evicted. Such a cache line selection policy ensures better preservation of the working set in the presence of data unit overwrites.

When a data unit is first added to RCache, it is preferably inserted into a memory buffer 117 and later packed by the RCache module into a cache line to be written out to flash. Data units from the same file may be chained together in the order of insertion so that they will be written to the cache line in the same order. Recovered data units, which have been alive longer and may have been accessed more often, may then, upon buffering, be chained separately from newly inserted data units. As a result, data units that have spatial and temporal locality are likely to be packed onto the same cache line. This increases the cache line eviction efficiency.

The invention claimed is:

1. In a processing system in which at least one entity issues data read and write requests to at least one storage system that stores data as data units, a caching method comprising:
    grouping pluralities of data units and writing each group as a respective cache line in a cache;
    deduplicating the cache;
    before evicting a selected one of the cache lines from the cache:
        determining that both a first data unit and a second data unit in the selected cache line are still active;
        determining that the first data unit is in use and the second data unit is not in use;
        reading said first data unit in the selected cache line and writing it to a different cache line; and
    evicting the selected cache line from the cache without writing the second data unit to another cache line in the cache.

2. The method of claim 1, further comprising:
    computing a content-derived fingerprint for each of the data units; and deduplicating the cache as a function of the content-derived fingerprints of the data units included in the cache.

3. The method of claim 1, further comprising:
for the data units in the cache, maintaining a count of references by the at least one writing entity to the respective data units; and
determining that a data unit with a reference count of zero is not in use.

4. The method of claim 1, in which sets of the data units correspond to respective data objects, further comprising:
enumerating references to the data units to be retained in the cache for respective data objects; and
determining that a data unit with no references to it is not in use.

5. The method of claim 1, further comprising:
determining a measure of a level of activity of the data units in the cache lines; and
selecting the cache line for eviction based on a plurality of factors, wherein the plurality of factors includes both:
the measures of activity of the data units in the different cache lines, and
the number of data units that are not in use in the different cache lines.

6. The method of claim 1, in which the data units are clumps, each clump comprising a plurality of data blocks.

7. The method of claim 1, further comprising:
buffering the active data units of the cache line selected for eviction;
determining which, if any, of the buffered active data units are associated; and
including the buffered, associated, evicted but active data units in a common new cache line.

8. The method of claim 1, further comprising implementing the cache as a solid-state drive (SSD).

9. The method of claim 1, in which the cache is within a host and caches data stored in a plurality of shared, remote storage nodes.

10. A processing system comprising:
at least one entity that issues data read and write requests to at least one storage system that stores data as data units;
a caching system comprising a caching component provided:
for grouping pluralities of the data units and for deduplicating the cache;
for writing each group as a respective cache line in a cache, and
before evicting a selected one of the cache lines from the cache:
for determining that both a first data unit and a second data unit in the selected cache line are still active;
for determining that the first data unit is in use and the second data unit is not in use;
for reading said first data unit in the selected cache line and writing it to a different cache line; and
for evicting the selected cache line from the cache without writing the second data unit to another cache line in the cache.

11. The system of claim 10 further comprising a storage management component provided:
for computing a content-derived fingerprint for each of the data units; and
for deduplicating the cache as a function of the content-derived fingerprints of the data units included in the cache.

12. The system of claim 10, in which the caching component is further provided:
for the data units in the cache, for maintaining a count of references by the at least one writing entity to the respective data units; and
for determining that a data unit with a reference count of zero is not in use.

13. The system of claim 10, in which:
sets of the data units correspond to respective data objects; and
the caching component is further provided
for enumerating references to the data units to be retained in the cache for respective data objects; and
for determining that a data unit with no references to it is not in use.

14. The system of claim 10, in which the caching component is further provided:
for determining a measure of a level of activity of the data units in the cache lines; and
for selecting the cache line for eviction based on a plurality of factors, wherein
the plurality of factors includes both:
the measures of activity of the data units in the different cache lines, and
the number of data units that are not in use in the different cache lines.

15. The system of claim 10, in which the data units are clumps, each clump comprising a plurality of data blocks.

16. The system of claim 10, further comprising:
a buffer buffering the active data units of the cache line selected for eviction;
said caching component being further provided for determining which, if any, of the buffered active data units are associated; and for including the buffered, associated, evicted but active data units in a common new cache line.

17. The system of claim 10, in which the cache is a solid-state drive (SSD).

18. The system of claim 10, in which the cache is within a host and caches data stored in a plurality of shared, remote storage nodes.

* * * * *

UNITED STATES PATENT AND TRADEMARK OFFICE
CERTIFICATE OF CORRECTION

PATENT NO. : 10,061,706 B2
APPLICATION NO. : 15/220409
DATED : August 28, 2018
INVENTOR(S) : Ata Bohra, Mike Chen and Boris Weissman Page 1 of 1

It is certified that error appears in the above-identified patent and that said Letters Patent is hereby corrected as shown below:

In the Claims

Column 9
Claim 11: Line 47
Delete "the cache" and insert --a cache--.
Claim 11: Lines 48-49
Delete "a cache" and insert --the cache--.

Signed and Sealed this
Twenty-fifth Day of September, 2018

Andrei Iancu
*Director of the United States Patent and Trademark Office*